(12) United States Patent
Mugica et al.

(10) Patent No.: US 7,058,055 B2
(45) Date of Patent: Jun. 6, 2006

(54) METHOD OF DEVICE-TO-DEVICE COMMUNICATIONS IN HYBRID DISTRIBUTED DEVICE CONTROL NETWORKS

(75) Inventors: Antonio Mugica, Boca Raton, FL (US); Paul Babic, Caracas (VE); Lino Iglesias, Caracas (VE)

(73) Assignee: Smartmatic Corp., Boca Raton, FL (US)

(*) Notice: Subject to any disclaimer, the term of this patent is extended or adjusted under 35 U.S.C. 154(b) by 0 days.

(21) Appl. No.: 10/906,561

(22) Filed: Feb. 24, 2005

(65) Prior Publication Data

US 2005/0129022 A1 Jun. 16, 2005

Related U.S. Application Data

(63) Continuation of application No. 09/682,073, filed on Jul. 17, 2001, now abandoned.

(51) Int. Cl.
*G06F 11/00* (2006.01)
*H04J 3/16* (2006.01)

(52) U.S. Cl. ............... 370/392; 370/235; 370/256; 370/467

(58) Field of Classification Search ............. 370/231, 370/235, 353, 373, 384, 388, 389, 392, 395.5, 370/401, 409, 467, 256; 455/445, 517
See application file for complete search history.

(56) References Cited

U.S. PATENT DOCUMENTS

| | | | | |
|---|---|---|---|---|
| 5,280,480 A | * | 1/1994 | Pitt et al. ................. 370/256 |
| 5,353,283 A | * | 10/1994 | Tsuchiya ................. 370/392 |
| 5,442,633 A | * | 8/1995 | Perkins et al. ............. 370/331 |
| 6,385,171 B1 | * | 5/2002 | Takase et al. ............. 370/235 |

* cited by examiner

*Primary Examiner*—Afsar Qureshi
(74) *Attorney, Agent, or Firm*—Jeffrey Furr

(57) ABSTRACT

The present invention comprises a method of source routing to implement device-to-device communications across a hybrid distributed device control network. The method is based in packet communications in which packets are structured so that they can be readily converted between communications protocols, and in which packets enclose routing information and parameters.

7 Claims, 6 Drawing Sheets

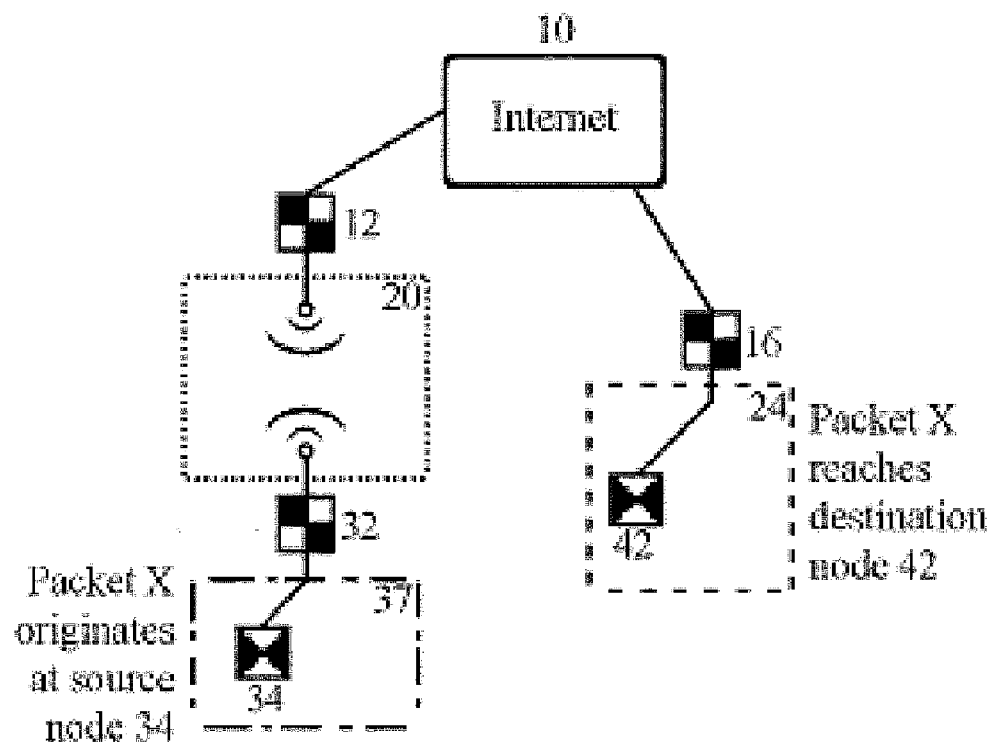

METHOD OF DEVICE-TO-DEVICE COMMUNICATIONS IN HYBRID DISTRIBUTED DEVICE CONTROL NETWORKS

RELATED APPLICATION

This application is a continuation of application Ser. No. 09/682,073, filed Jul. 17, 2001, now abandoned.

BACKGROUND RELATED APPLICATIONS

This invention uses the concepts of true distributed control and distributed device control network of our co-pending applications. It also uses the concepts of device controller and network-enabled devices.

1. Background Field of Invention

This invention relates to device-to-device network communication methods and systems, specifically to device-to-device communications across a hybrid distributed device control network.

2. Background Discussion of Prior Art

The Cambridge Dictionary of American English defines a "device" to be an object or machine invented to fulfill a particular purpose. According to the present invention, the term "device" is not limited to physical apparatus, but is considerably expanded to comprise abstract or virtual devices, such as system operators, that take part in network communications. One fundamental characteristic of devices is that they comprise a finite set of states associated with their operation.

Source routing is packet routing in which a source node has a priori knowledge of the network path to a destination node, i.e., a complete sequence of intermediary network nodes a packet must traverse to reach its destination. This routing information is included in the header of every sent packet.

Source routing is implemented in many network communication environments (e.g., Internet Protocol). Yet, its use is deemed inefficient for regular network package routing due to the overhead of increased packet header size it involves, and it is virtually never used, except for network mapping and troubleshooting instances.

Nonetheless, the simplicity of using source routing communications makes it positively suitable and advantageous for some applications, specifically hybrid distributed device control networks, since its use greatly reduces the cost and complexity of hardware logic of network routing devices and allows for faster networks.

According to the present invention, a hybrid distributed device control network comprises a set of interconnected subnetworks of arbitrary topology, each containing several interconnected device controllers and/or network-enabled devices. The term "hybrid" refers to a network that comprises several subnetworks interconnected across dissimilar communication media (e.g., Ethernet, RF, etc.), and using different communication protocols (e.g., LONtalk, UDP/IP, etc.). Subnetworks using incompatible protocols are interconnected at network routers which act as dual nodes, translating and transferring packets between subnetworks and communication protocols. There are two types of source routing, strict and loose. In strict source routing, every intermediary network node is explicitly specified in the packet header at the source. In loose source routing, a set of intermediary nodes through which the packet must pass are specified in the packet header, but each of these may reside several hops away from one another.

Implementing a communication system over a hybrid distributed device control network using source routing requires simpler processing that results in reduced implementation complexity and cost. Source routing is also compatible with the philosophy of true distributed control because packet routing information is contained at each node where packets originate.

In the recent past, there have been several attempts to create a method of source routing to communicate across hybrid networks (e.g., U.S. Pat. No. 5,570,084). However, the resulting methods are definitely inadequate for device-to-device communications because they do not implement important communications services, namely, multicasting and broadcasting, which are absolutely required for inter-device communications. Other attempts have been made to propose generic methods for routing packets in communications networks (e.g., U.S. Pat. No. 5,353,283). However, the resulting methods either have been developed for networks with limited topologies or cannot be used in networks comprising subnetworks using incompatible communications protocols and/or dissimilar communications media.

Hence, it is an object of the present invention to overcome the disadvantages of the prior art, presenting a source routing communication method specifically designed for interdevice packet routing across networks comprising different communication protocols (e.g., LONtalk, UDP/IP, etc.) and media (e.g., Ethernet, RF, etc.), and providing several communication services.

SUMMARY OF INVENTION

The present invention comprises a method of source routing to implement device-to-device communications across a hybrid distributed device control network. The method is based in packet communications in which packets are structured so that they can be readily converted between communications protocols, and in which packets enclose routing information and parameters.

OBJECTS AND ADVANTAGES

Accordingly, several objects and advantages of the present invention are:

a) To provide a flexible method designed and developed specifically for interdevice communications, which addresses and overcomes the limitations of existing communications methods;

b) to provide a method of source routed communications designed to fulfill requirements of device-to-device communications, which reduces the complexity and cost of system implementation of existing communications methods;

c) to provide a method of device-to-device communications which can be used in networks independently of the network communication protocols and/or media used, and which indicates how a packet should be transferred and translated between networks using different network communication protocols and/or media;

d) to provide a flexible method of device-to-device communications which supports dynamic structuring of communication packets, depending on the communication services required;

e) to provide a method of device-to-device communications which supports one-to-many communication services, including multicasting and broadcasting;

f) to provide a method of device-to-device communications in which all network nodes and routers, once configured, operate autonomously in agreement with the philosophy of true distributed control; Other objects and advantages of this invention will become apparent from a consideration of the ensuing description and drawings.

BRIEF DESCRIPTION OF DRAWINGS

In the drawings, closely related figures have the same number but different alphabetic suffixes.

FIG. 4 comprises a simplified version of the network shown in FIG. 1.

Figure 1:
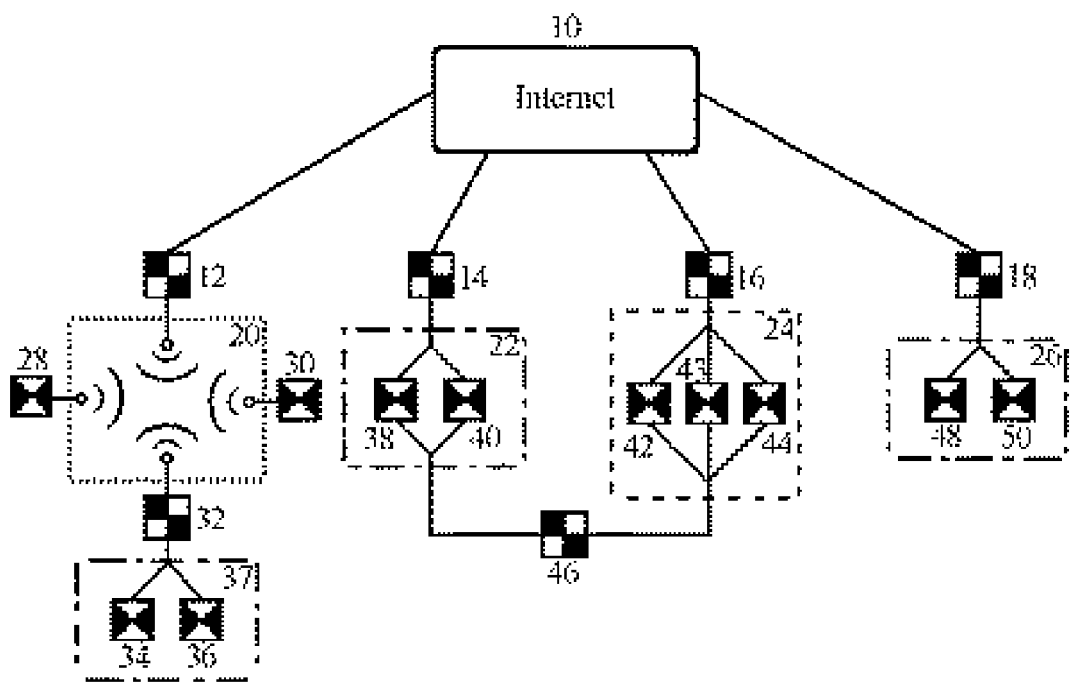
FIG. 1 shows an exemplary hybrid distributed control network.

The terms Type I, II and III Networks are arbitrary terms used to differentiate between exemplary subnetworks using dissimilar communication protocols and media. Any network protocol type may be substituted in their stead.

LIST OF REFERENCE NUMERALS IN DRAWINGS

10 Internetwork
12 Network Router Node (Internet to Type III Network)
14, 18 Network Router Node (Internet to Type II Network)
16 Network Router Node (Internet to Type I Network)
20 Type III Subnetwork (Wireless)
22, 26, 37 Type II Subnetwork
24 Type I Subnetwork
28, 30 Type III Network End Node
32 Network Router Node (Type III Network to Type II Network)
34, 36, 38, 40, 48, 50 Type II Network End Nodes
42, 43, 44 Type I Network End Nodes
46 Network Router Node (Type I Network to Type II Network)
210 Alarmed electric door
212 Device controller controlling
214 Device controller controlling
216 Alarm siren
218 Network-enabled Alarm siren

DETAILED DESCRIPTION

Now, the present invention will be described by referring to the accompanying drawings that illustrate preferred embodiments of the invention.

FIG. 1 illustrates an exemplary hybrid distributed device control network in which a plurality of network router nodes 12, 14, 16 and 18, hereafter referred to as routers, are connected to an internet 10. Said routers serve as connection links between internet 10 and a set of subnetworks 20, 22, 24, 26, which use dissimilar communication protocols and/or media. In FIG. 1, subnetwork 20 is of hypothetical Type III (e.g., using radio frequency as medium), subnetworks 22 and 26 are of hypothetical Type 11 (e.g., using LONtalk protocol), and subnetwork 24 is of hypothetical Type I (e.g., using UDP/IP over Ethernet). There are two further components, namely, a subnetwork 37 and a router 46. Subnetwork 37 connects to subnetwork 20 through a router 32. Likewise, router 46 connects subnetworks 22 and 24 together.

Each said subnetwork contains a plurality of network end nodes, hereafter referred to as nodes. For instance, subnetwork 20 comprises nodes 28 and 30; subnetwork 22 comprises nodes 38 and 40; subnetwork 24 comprises nodes 42, 43 and 44;

subnetwork 26 comprises nodes 48 and 50; subnetwork 37 comprises nodes 34 and 36.

In said hybrid distributed device control network, hereafter referred to as network, a packet originating at a source node is directly received at a destination node, provided both source and destination nodes reside in the same subnetwork. For instance, a packet originating at source node 44 will directly reach destination node 42, within subnetwork 24.

Furthermore, a packet originating at a source node whose destination node resides in a different subnetwork must traverse a network path through one or more routers to reach its destination. For instance, a packet originating at source node 42 must pass through routers 16 and 14 to reach destination node 38.

In this method, every router interconnects two subnetworks, and thus exists in two subnetworks simultaneously, transferring packets from one subnetwork into another. Since the two subnetworks interconnected by a router use different communication protocols and/or media, it follows that a router must have two different network addresses, one for each of its associated subnetworks. For example, router 46 must have a Type II Network address seen by nodes 38 and 40 of subnetwork 22, and a Type I Network address seen by nodes 42, 43 and 44 of subnetwork 24.

Figure 2A:
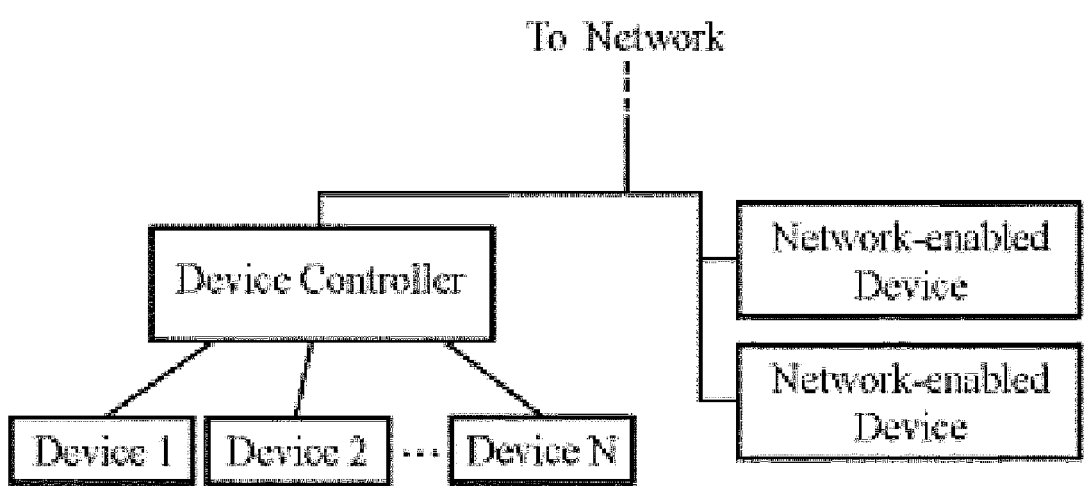
FIG. 2A illustrates a general configuration of device controllers and network-enabled devices.

Every node in said network is either a device controller to which several devices may be connected, or a network-enabled device, i.e., a conventional device with added capabilities to communicate across a network. FIG. 2A illustrates this.

The main functions of a device controller include controlling the state of all conventional devices connected to it, such as modifying the device's operating state (e.g., command execution, activations, deactivations, etc.), detecting an operating state change or reporting on the operating state change of a device (e.g., event reporting), among others. Some typical devices include electric doors, thermal sensors, GPS, video cameras, several others. The main functions of a network-enabled device include reporting on its operating state, among others.

Figure 2B:
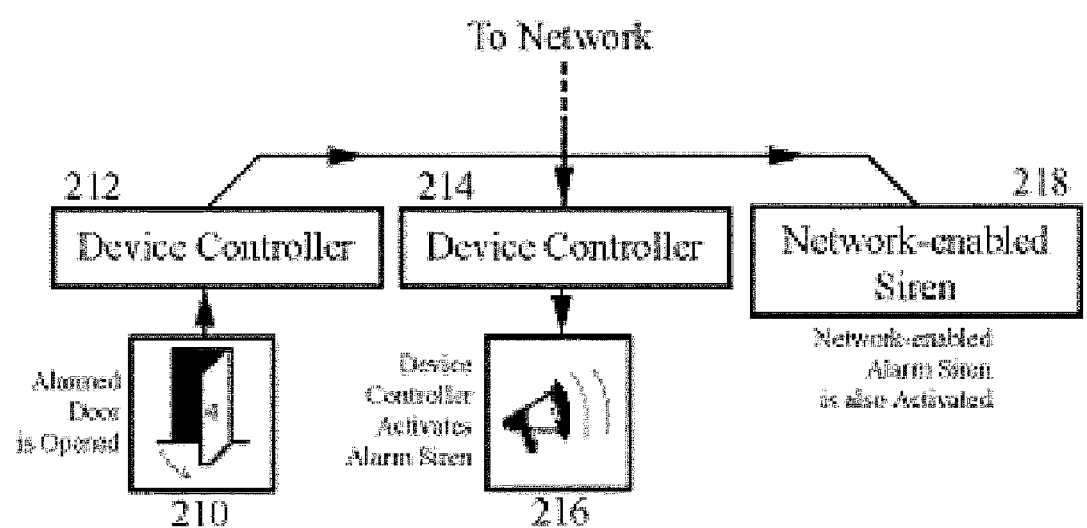
FIG. 2B shows an exemplary instance of device-to-device communications, between an alarmed door and an alarm siren.

This invention concerns communication between device controllers and/or network-enabled devices across networks. FIG. 2B illustrates an exemplary case: an electric door 210 controlled by a device controller 212 is opened. Said controller 212 detects the state change in said electric door 210 and sends two messages or packets across the network. The first packet reaches device controller 214, containing a command to activate an alarm siren 216. The second packet reaches network-enabled alarm siren 218 and activates it.

Figure 3:
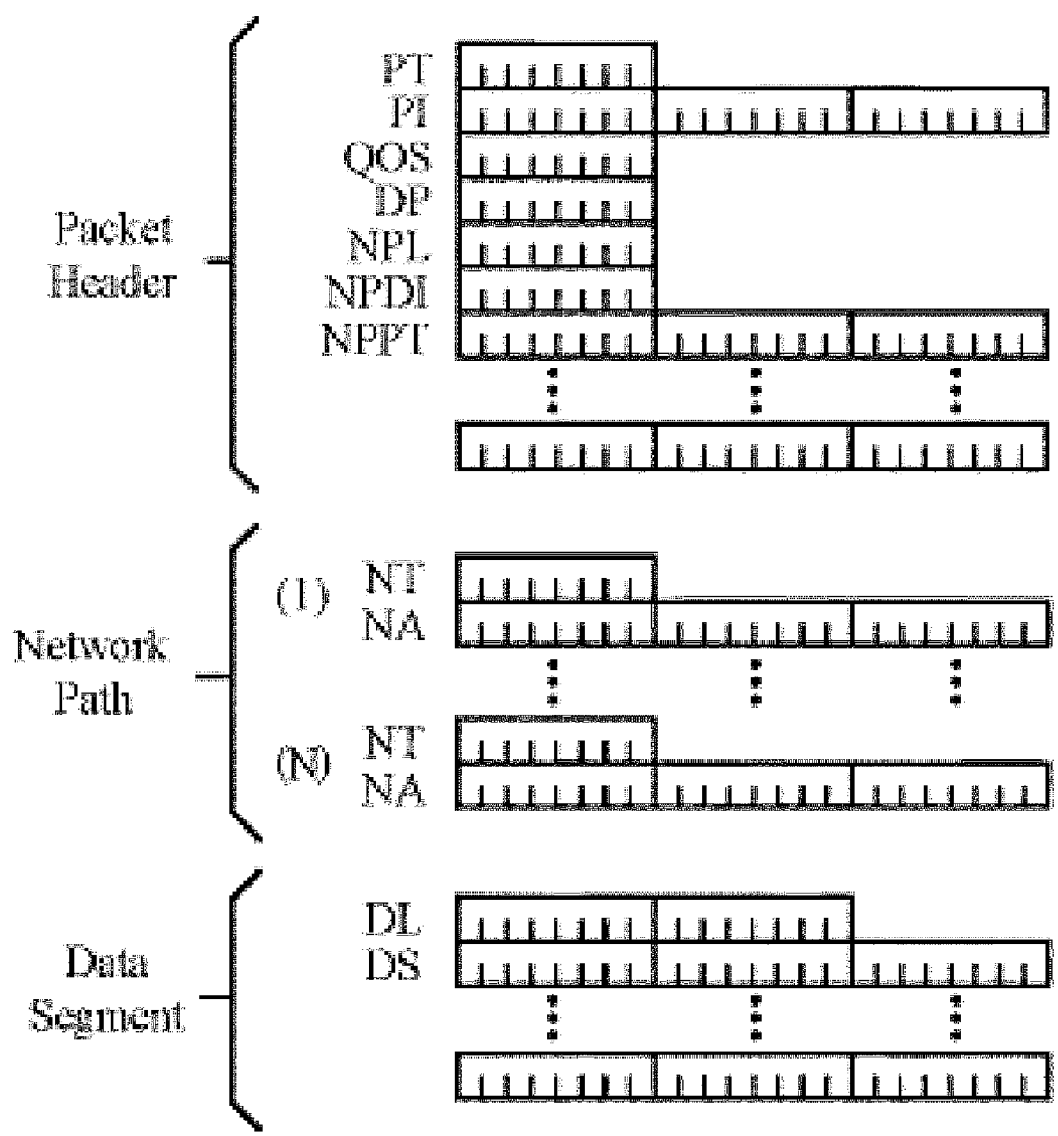
FIG. 3 displays the structure of a generic network communications packet.

In source routing, each packet or message originating at a network node contains packet routing information, including a list of all network routers a packet must traverse in order to reach its destination node. The structure of a packet is described next, and is shown in FIG. 3.

According to the present invention, a packet consists of three fundamental sections: header, network path and data. The headers section contains general information about the packet, including a packet type and a packet identification number, among several others. The network path section comprises a list of all network node addresses a packet must traverse to reach its final destination. The data section contains the actual packet content information.

The header section contains several information fields: Packet Type (PT): a number which specifies the type of said packet, and which indicates the type of communication services that said packet requires. Packet types include ACK (i.e., referring to a packet sent to acknowledge receipt of another packet), NO_ACK (i.e., referring to a packet comprising data which requires an ACK packet response), UNACK (i.e., referring to a packet comprising data which requires no ACK packet response), BROADCAST (i.e., referring to a packet directed to all nodes in a given subnetwork), MULTICAST (i.e., referring to a packet directed to some nodes in a given subnetwork), among others. Depending on the value of this field, the structure of the packet may vary, as described below. In one implementation, this field consists of one byte, allowing 255 possible packet type values.

Packet ID (PI): a number which serves as a unique identifier for said packet. In one implementation, this field consists of three bytes.

Quality of Service (QOS): a set of bits which specify several network parameters that modify how a package is handled by network routers. The most important of these parameters is packet priority. In one implementation, this field consists of one byte.

Network Path Length (NPL): a number indicating the number of nodes that said packet must traverse in order to reach its destination, including the source and destination nodes. In one implementation, this field consists of one byte.

Data Pointer (DP): a number that points to the beginning of the data section below. Specifically, it contains the offset in bytes from the beginning of the packet to the beginning of the data section.

Network Path Pointer Table (NPPT): a set of fields that contain pointers to entries in the Network Path section described below. Specifically, said pointers specify the offset from the beginning of the packet to the start of every entry in the Network Path section below. The order in which network nodes are found on this table determines the order in which network nodes will be traversed by the packet. The table has as many entries as specified in the Network Path Length above. Note that to alter the network path that a message must follow you can modify the order in which network address are pointed at by NPPT entries. For instance, to reverse the order of the nodes that a packet must traverse, reverse the order of the entries in the NPPT. In one implementation, each table entry consists of one byte.

Network Path Destination Index (NPDI): a number specifying the next entry in the NPPT to which the packet should be transmitted. For instance, when the packet is at source node 34, this field has a value of two ("2"), referring to the second entry in the NPPT, which points to the address of router 32. After the packet reaches router 32, this field will have a value three ("3"), referring to the third entry in NPPT, which points to the address of router 12, and so on. In one implementation, this field consists of one byte.

Multicast Pointer (MP): (only included if Packet Type equals "40", in multicast packets.) This field contains a number that points to the last router entry in the Network Path Pointer Table, which connects to the subnetwork that contains all nodes receiving the multicast packet. This number must be equal to or lesser than the Network Path Length specified above. In one implementation, this field consists of one byte.

Network Path section consists of a list of at least two network address entries comprising all network routers a packet must visit to reach its destination. Each entry consists of two members: a network type identifier and a network address.

Network Type (NT): a number specifying the network type of the router network address that follows. In one implementation, this field consists of one byte.

Network Address (NA): a variable-length number specifying a network address to which said packet must be sent. In one implementation, this field consists of four bytes.

Finally, the Data section contains two fields: Data Length (DL): a number specifying the length of the data segment contained in said packet. In one implementation, this field consists of two bytes.

Data Segment (DS): a data segment of the above data length. This segment contains the actual data for which this message is sent. In the example of FIG. 2B, the data of the packet traveling from nodes 212 to 214 comprises a control command which activates the alarm siren controlled by node 214.

OPERATION OF INVENTION

Let there be a packet X, structured as described above, which originates at a source node and travels across a network to reach a destination node. Packet X includes a network path section with a complete list of network routers it must traverse to reach its destination. Although packet X comprises the exact network route it must traverse to reach its destination, it does not contain any protocol-specific information. Instead, packet X is a message unit that must be encapsulated in a protocol-specific packet depending on the network where it may circulate. Hence, each node that sends or receives packet X must encapsulate or decapsulate packet X accordingly.

FIG. 4 is an exemplary illustration of the following description of the method presented in this invention. It is a simplified version of FIG. 1, following the same numeral pattern. A packet X is created at a source node 34 which must traverse a network to reach destination node 42. Source node 34 encapsulates packet X within a packet X0, a protocol-specific packet that can be processed by subnetwork 37 (i.e., Type II Network). Next, source node 34 sends packet X0 out across subnetwork 37 towards router 32.

Router 32 receives packet X0 and decapsulates it to retrieve packet X. Next, router 32 updates packet X's NPDI to point to the next destination address in the NPPT (i.e., router 12). Next, router 32 encapsulates packet X into a packet X1, following the protocol used by subnetwork 20 (i.e., Type III Network), and sends packet X1 out across subnetwork 20 towards router 12.

Router 12 receives packet X1 and decapsulates it to retrieve packet X. Next, router 12 updates packet X's NPDI to point to the next destination address in the NPPT (i.e., router 16). Next, router 12 encapsulates packet X into a packet X2, following the protocol used by an internet 10, and sends packet X2 out across internet 10 towards router 16.

Router 16 receives packet X2 and decapsulates it to retrieve packet X. Next, router 16 updates packet X's NPDI to point to the next destination address in the NPPT (i.e., node 42). Next, router 16 encapsulates packet X into a packet X3, following the protocol used by subnetwork 16 (i.e., Type I Network), and sends packet X3 out across subnetwork 24 towards node 42.

When packet X3 is received at destination node 42, it is decapsulated and packet X is retrieved from it. Node 42 processes the data section of packet X.

To summarize, a packet originates at a source node and comprises an exact network path that the packet must traverse. Such packet is sent through all nodes and routers comprised in the packet's network path section. The packet is encapsulated, and the destination address is included in the encapsulation headers. Then, the encapsulated packet is decapsulated. This process is repeated until the packet passes through all required subnetworks of dissimilar communications protocols and media. At each network router, the packet is modified accordingly so that its NPDI points to the next destination that the packet must reach. The rest of the contents of the packet remains untouched. Once it reaches its final destination node, the packet's data section is processed.

The above is a description of the basic communication method, assuming the simplest type of communication service, namely, forward transmission demanding no reply. The method varies according to the type of communication service specified in the packet's Packet Type field. These variations are described next.

If the type of communications service requires a response from the destination node, then a return or backward path to source node 34 must be known by destination node 42. Note that in the basic method above, destination node 42 cannot retrieve the return path towards source node 34 from packet Ax's headers. For instance, packet X only contains router 16's address as seen by internet 10, and does not contain router 16's address as seen by subnetwork 24.

The type of communications in which a source node requires a response from a destination node is described next. This is referred to as Response communications service. When a router receives a packet from one of its two interconnecting subnetworks, it modifies the packet's network address path list (NT and NA fields) substituting the router address as seen by its sending subnetwork for the router address as seen by its receiving subnetwork. For instance, in FIG. 4A, when packet X leaves node 34 and reaches router 32, it contains router 32's address as seen by subnetwork 37 (i.e., receiving subnetwork). Router 32 then replaces said address by router 32's address as seen by subnetwork 20 (i.e., sending subnetwork), and transmits packet X to router 12. When packet X reaches router 12, its network address path contains router 12's address as seen by subnetwork 20. Router 12 then replaces said address by router 12's address as seen by internet 10, and transmits packet X to router 16. This substitution recurs at every router found on packet X's network path. Once packet X reaches destination node 42, its network path section contains all router addresses as seen from node 42's perspective, thus, allowing it to reach source node 34, when a response is necessary.

When said destination node needs to send a response packet out to said source node, it may copy the structure of the received packet X, invert the entries of the NPPT (so that the network path is reversed), set the appropriate header fields (e.g., PT, NPDI, QOS, etc.), and enclose the corresponding data segment. Hence, this shows that processing required for generating response packets is minimal.

Figure 5A:
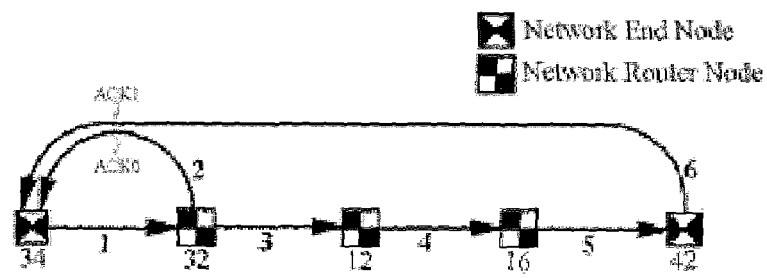
FIG. 5A illustrates the acknowledge communications service.

In a second type of communications service, the Acknowledge (ACK) communications service, it is desired that responses be sent back from a destination node to a source node to acknowledge receipt of a packet. In these circumstances, if acknowledgement messages are not received at the source node within a time frame, the source node may resend the packet. An instance of this type of communication services is illustrated in FIG. 5A (for Packet Type equal to "50"). Source node 34 generates packet X of said type and sends it to destination node 42 (step 1). Upon receiving packet X, router 32 sends an ACK packet (Packet Type equals "51") to source node 34 (step 2, ACK0). Then, packet X travels to nodes 12 and 16 (steps 3, 4 and 5). Once destination node 42 receives packet X, another ACK packet is sent back to source node 34 (step 6, ACK1). Thus, only upon receipt of both ACK0 and ACK1 packets does source node 34 consider packet X transmission successful. Otherwise, source node 34 may resend packet X.

Figure 5B:
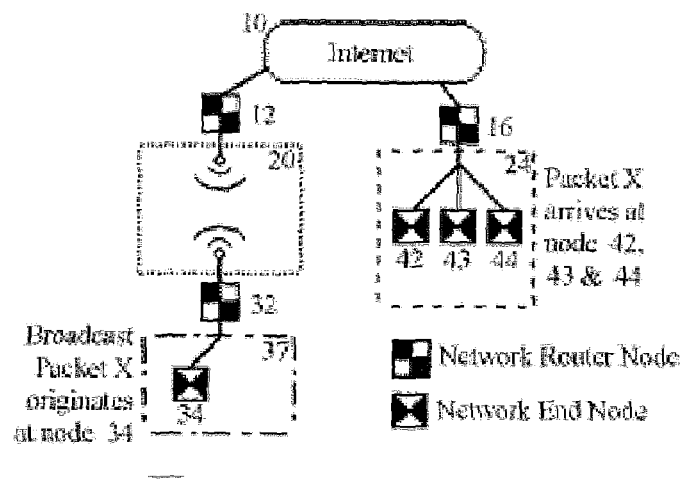
FIG. 5B illustrates the broadcast communications service.
Figure 5C:
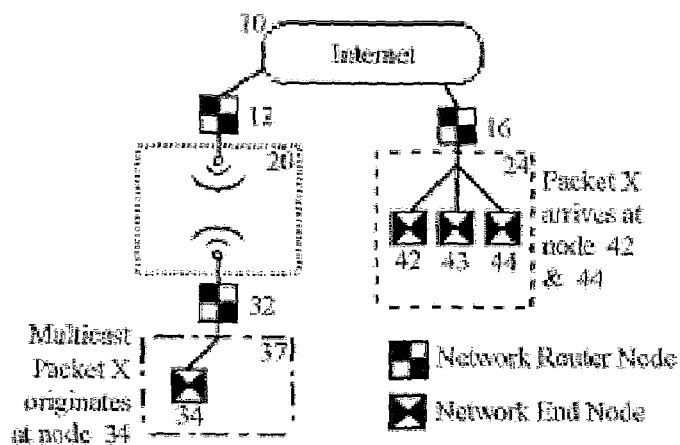
FIG. 5C illustrates the multicast communications service.

In the Broadcast communications service, the purpose is to send a packet that will be broadcasted to all nodes connected to a given subnetwork. A broadcast packet is structured as described above. The Packet Type field is set to "45", and the destination node network address is set to a broadcast indicator (i.e., all address bytes are set to "255"). After said broadcast packet leaves a source node, it traverses a set of network routers, and then is broadcast into a subnetwork by the last router in the network path. FIG. 5B illustrates an instance of broadcast. In FIG. 5B, node 34 generates a broadcast packet destined for subnetwork 24. Said broadcast packet leaves node 34 and traverses all intermediate subnetworks (i.e., 32, 12 and 16) as described above. When router 16 checks the network path section of the broadcast packet and finds an address consisting of "255" numerals, it encapsulates it into a protocol-specific broadcast packet and sends it out to subnetwork 24.

In the Multicast communications service (i.e., Packet Type equals "40"), the purpose is to send a packet that will reach many but not all nodes contained in a specific subnetwork. FIG. 6C illustrates an instance of this service, where a multicast packet X leaves node 34 and reaches nodes 42 and 44, but does not reach node 43. The header section of multicast packets comprises an extra Multicast Pointer field, as described above, that specifies the NPPT entry that points to the address of the end router in the network path which must send the multicast packet (e.g., router 16 of FIG. 6C). Multicast packet X traverses the network path exactly as any other packet until it reaches the router specified by Multicast Pointer (e.g., router 16). If the subnetwork where multicast packet X must be sent out (e.g., subnetwork 24) supports multicasting, said router encapsulates said packet X inside a protocol-specific multicast packet and sends it out. If said subnetwork does not support multicasting, said router will retrieve all multicast target addresses from the network address section of packet X (e.g., nodes 42 and 44) and transmit a protocol-specific encapsulated packet to each specified destination. In the instance of FIG. 6C, in case subnetwork 24 does not support multicasting router 16 will send copies of packet X to nodes 42 and 44, as specified in the network address section of packet X.

CONCLUSION, RAMIFICATIONS AND SCOPE OF INVENTION

Thus, the reader will see that the present method of device-to-device communications provides a flexible method of source routed communications designed to fulfill requirements of interdevice communication which solves all limitations of existing methods. This comprehensive method can be used in any network independently of the associated communication protocol and/or media, reduces the complexity and cost of system implementation of existing communications methods, and supports one-to-many interdevice communication.

While our above description contains much specificity, this should not be construed as limitations to the scope of the invention, but rather as an exemplification of one preferred embodiment thereof. Obviously, modifications and alterations will occur to others upon a reading and understanding of this specification such as, for example, several possible variations to the presented packet structure to include other network routing parameters, several variations to the presented communications services, especially to different modes of the Acknowledge communications service. The description above is intended, however, to include all such modifications and alterations insofar as they come within the scope of the appended claims or the equivalents thereof.

What is claimed is:

1. A method of source routing to implement device-to-device communications across a hybrid distributed device control network, said method comprising: a) originating a packet at a source node where said packet is being broadcast to all the nodes in a subnetwork in which the additional steps of: identifying the packet as a broadcast packet; encapsulating the broadcast packet in a protocol-specific packet used by the destination subnetwork; and passing said broadcast packet to the nodes on the destination subnetwork; b) having the packet consists of sections including; i) a header, ii) a network path, and iii) data; c) encapsulating the packet in a protocol-specific packet used by the subnetwork of the source node; d) passing said protocol-specific packet to the first destination router in the network path; e) having the router decapsulate the protocol-specific packet; f) increment the next path destination index counter by one; g) using the next path destination index counter to point to the next path destination address; h) encapsulating the packet in a protocol-specific packet used by the next destination subnetwork where said encapsulation packet has an encapsulation header that contains a destination address; i) passing said protocol-specific packet to the next destination router in the network path; j) repeating the previous five steps until the packet reaches the final destination node; k) identifying the packet as a broadcast packet; and l) encapsulating the broadcast packet in a protocol-specific packet used by the destination subnetwork; and m) passing said broadcast packet to the nodes on the destination subnetwork; n) having a response packet consist of sections including; i) a header, ii) a network path, and iii) data; o) creating an acknowledgement network path by inversing the network path of the packet; p) encapsulating the response packet in a protocol-specific packet used by the subnetwork of the destination node; q) passing said protocol-specific packet to the first destination router in the acknowledgement network path; r) having the router decapsulate the protocol-specific packet; s) increment the next path destination index counter by one; t) using the next path destination index counter to point to the next path destination address; u) encapsulating the response packet in a protocol-specific packet used by the destination addresss subnetwork; v) passing said protocol-specific packet to the next destination router in the network path; and w) repeating the previous five steps until the response packet reaches the source node.

2. The method according to claim 1 wherein a packet is being broadcast to all the nodes in a subnetwork in which the additional steps of: passing said broadcast packet to the nodes on the destination subnetwork.

3. The method according to claim 1 wherein said packet header section contains the following fields: a) Packet Type; b) Packet ID; c) Quality of Service; d) Network Path Length; e) Data Pointer; f) Network Path Pointer Table; g) Network Path Destination Index; and h) Multicast Pointer.

4. The method according to claim 1 wherein said Network Path section contains the following fields: a) Network Type; and b) Network Address.

5. The method according to claim 1 wherein said Data section contains the following fields: a) Data Length; and b) Data Segment.

6. The method according to claim 1 wherein only upon receipt of a plurality of response packets does source node consider the packet transmission successful.

7. The method according to claim 6 wherein if response packets are not received said source node may resend said packet.

* * * * *